United States Patent [19]

Whitehead et al.

[11] 4,043,044

[45] Aug. 23, 1977

[54] SURFACE-FOLLOWING CARTRIDGE FOR USE WITH LINEAR MEASUREMENT TRANSDUCER SYSTEMS

[75] Inventors: Jan Valgene Whitehead, Montclair; Frederick J. Reininger, Ontario; Arthur Lawrence, Upland, all of Calif.

[73] Assignee: The United States of America as represented by the Secretary of the Navy, Washington, D.C.

[21] Appl. No.: 634,576

[22] Filed: Nov. 24, 1975

[51] Int. Cl.² ............................ G01B 3/22; G01B 5/00
[52] U.S. Cl. ................................. 33/172 E; 33/174 L; 33/173; 33/174 P
[58] Field of Search ............ 33/172 E, 174 E, 174 P, 33/147 N, 173; 324/34 PS, 34 D, 34 TK

[56] References Cited

U.S. PATENT DOCUMENTS

| 2,215,148 | 9/1940 | Ehrler et al. | 33/147 N |
| 2,336,695 | 12/1943 | Maurer | 33/172 R |
| 2,387,496 | 10/1945 | Cornelius | 33/147 N |
| 2,492,369 | 12/1949 | Robins | 33/174 L |
| 2,833,046 | 5/1958 | Jeglum | 33/172 E |
| 3,213,360 | 10/1965 | Cook et al. | 33/172 E |
| 3,851,242 | 11/1974 | Ellis | 324/34 PS |
| 3,895,446 | 7/1975 | Orlov et al. | 33/174 PA |

FOREIGN PATENT DOCUMENTS 892,873  1/1944  France .................. 33/172 E

Primary Examiner—Harry N. Haroian
Attorney, Agent, or Firm—Richard S. Sciascia; Paul N. Critchlow

[57] ABSTRACT

Presently available transducer systems provide analog electrical outputs proportional to the linear displacement of an active element from the surface being measured. However, use requires that all or part of the surface be conductive. The present cartridge permits use of these transducers on any surface, conductive or not. It includes a tubular casing receiving both an active element portion of the transducer and a plunger formed of a conductive material. The plunger is reciprocally mounted with a compression spring normally urging it outwardly so that its tip end can contact and follow the surface to be measured. A set screw arrangement limits the plunger reciprocation. The length of the received portion of the transducer is precisely adjustable so that its active element can be disposed a precise spaced distance from the plunger when it is spring-pressed to its limit. As the plunger tip rides the surface being sensed its inward motion is limited by contact with the transducer end wall. The limited stroke covers a distance representing the full range of the transducer itself so that the system can be calibrated for the range of the transducer to assure reliable transducer read-outs.

7 Claims, 3 Drawing Figures

SURFACE-FOLLOWING CARTRIDGE FOR USE WITH LINEAR MEASUREMENT TRANSDUCER SYSTEMS

BACKGROUND OF THE INVENTION

The present invention relates to gages and the like for linearly measuring non-conductive surfaces and, in particular, to the adaptation of the so-called electronic micrometer gages for such purposes.

As noted in the foregoing, presently available transducer systems which also are referred to as electronic micrometers generally require the presence of a conductive material to accomplish their purposes. The reason is that these micrometers generally operate by generating an electrical field which directly varies with the displacement distance of the generator from a conductive surface.

The present invention is concerned primarily with expanding the use of these prior art systems to the measurement of non-conducting surfaces. Such being the case, it may be helpful to consider in greater detail the particular types of systems which presently are contemplated. One of the better systems, for example, is known as the Kaman MULTI-VIT displacement measuring system produced by Kaman Sciences Corporation of Colorado Springs, Colo. The so-called MULTI-VIT system is, as suggested by the acronym, a multiple purpose variable impedance transducer system employing a series of individual non-contacting displacement measuring devices or units adapted to cover a wide range of measuring capabilities. In general the units each operate on an eddy-current loss principle achieved by an active transducer element in the form of an electrical bridge circuit activated by a 1 Mhz carrier. Magnetic flux lines eminating from the active element at the 1 Mhz rate pass into the surface being measured or sensed to produce eddy currents. If, as is required, the surface being sensed is a conductive surface, variations in the displacement of the active element from the conductive surface produce proportionate variations in the eddy current loss, these loss or impedance variations then being converted to a D. C. voltage proportional to the distance being sensed. In other words, as a conductive surface moves closer to the active element, more eddy-currents are generated and the losses within the grid circuit becomes greater. As the conductive surface moves away from the transducer, the losses become less. Because of the high frequency of the eddy-currents, they penetrate the conductive surface only a few mils depth so that displacement of conductive surfaces as thin as 0.50 mils have been successfully measured.

Such systems are most beneficial particularly in micro-measurement applications involving, as stated, the presence of the conductive material that produces the eddy-current variations. In fact, the increasing demands imposed by advancing technology on the accuracy of linear measurements have made classical measuring methods inadequate. The so-called Kaman electronic micrometer, however, have been found capable of providing the requisite accuracy. Measurements within a few micro inches resolution are obtained easily and quickly.

The disadvantages, however, lie in the fact that they are limited to use with conducting materials. For this reason, their benefits have not been available for measuring the linear accuracy of a number of important products which, for one reason or another, are manufactured from glass, plastics, or other non-conducting materials. One particular example of such a non-conducting object is the manufacture of a large number of missile radomes which are formed of a glass composition that requires, as a final fabrication step, the grinding of the glass composition to an extremely close tolerance. In the past, the combination of glass residue from the grinding process and the close product tolerances that are required to have produced problems particularly with excessive gage wear which itself results in limited gage use before the need for recalibration. Obviously the so-called electronic micrometers would resolve these problems except for the fact that the radomes are non-conductive.

In addition to the Kaman electronic micrometers which operate on the eddy-current loss principle, there are other types of transducing micrometers which provide comparable advantages and for which the present invention also can be adapted. For example, another type of electronic micrometer operates on a capacitive principle rather than the eddy-loss principle. Here again, however, the use of the capacitative type is limited to the presence of the conductive material. In this regard, the conductive material forms one plate of a capacitor which, in turn, varies its output proportionately to the variation of its displacement from the conductive surface. Within the limits imposed by the present claims, the present invention contemplates the application of the benefits of all of these so-called non-contacting electronic micrometers to the fabrication measurements of non-conductive products. Before continuing, it perhaps should be noted that the term 'transducer' has been used to describe these electronic micrometers. Obviously, the basic transducing capacity is that of converting variations in displacement distances to analog electrical outputs to provide readouts which if desired, easily can be converted to obtain a digital readout capability readout.

The objects and principle features of the invention are considered to be readily apparent in the foregoing discussion.

BRIEF DESCRIPTION OF THE DRAWINGS

The present invention is illustrated in the accompanying drawings of which.

DETAILED DESCRIPTION OF THE INVENTION

Figure 1:
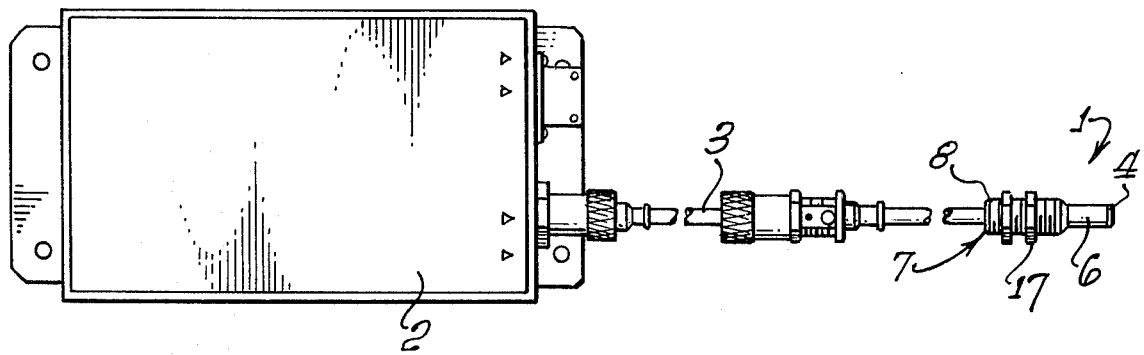
FIG.1 is an illustration of a prior art displacement measuring system known as the Kaman model KD-2300-ISU.

FIG. 1, as stated, illustrates a so-called prior art device. However, as will be appreciated, the device, in fact, is not strictly speaking prior art in the sense that the present invention represents either a modification or an improvement. Instead, the present invention simply seeks to extend the use of the illustrated device to measurements of non-conducting materials. The FIG. 1 illustration therefore is provided primarily to clarify description and to identify certain functionally-significant components of these micrometer systems. It will be understood that the illustrated Kaman device is only one of a series of instruments all of which have varying shapes and dimensions for which the present cartridge attachment must be adapted.

Referring to FIG. 1, the micrometer, to the extent that it presently is pertinent, can be considered as including a transducer head portion 1 coupled to a systems electronic unit 2 by a flexible electrical cable 3. in particular, it is to be noted that transducer head 1 includes what is presently identified as an active element 4 near the forward end of a cylindrical section 6 of the head. Also, as will be noted, cylindrical portion 6 of the head projects outwardly from a connector member 7, which is provided with exterior threads 8. In use, the micrometer is threadably received in a suitable support which holds active element 4 at a fixed distance from the surface being sensed or measured. The active element is a bridge circuit activated by a 1 Mhz carrier. More specifically, two arms of the bridge which are coils produce the magnetic flux lines which pass into the conductive surface being sensed to produce the eddy-currents. The presence of undulations in the sensed surface are detected since they reduce or extend the spaced distance of the active element from the surface to correspondingly increase or decrease the eddy-currents. Systems electronics unit 2 includes circuitry controlled by the resulting impedance variations to convert these variations to a D. C. voltage proportional to the distance being sensed. The Kaman model shown in FIG. 1 is one that can accurately gage the distance to a conducting target up to a range of 0.05 inches with a sensitivity to 0.070 inches.

Figure 2:
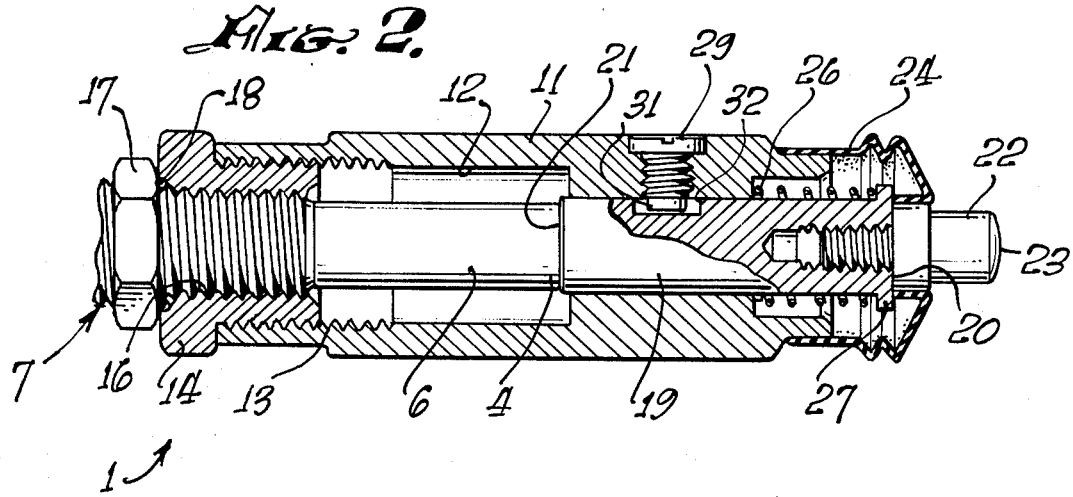
FIG. 2 is a sectional view of the cartridge of the present invention showing a portion of the Kaman micrometer mounted in the cartridge, and FIG. 3 schematically illustrates one intended use of the present cartridges.

The present invention, illustrated in FIG. 2, essentially is a cartridge-type of attachment capable of extending the use of the FIG. 1 device to a surface-contacting type of gage. Referring to FIG. 2, the cartridge generally is formed of an elongate tubular casing 11 having a central bore 12 which varies in diameter to accommodate the functional components mounted in the casing. One end of casing 11 is adapted to receive transducer head portion 6 of the FIG. 1 device. For this purpose, the bore of casing 11 is provided with a threaded extent 13 to receive a nut 14 which itself has a threaded bore portion 16 to receive transducer head section 6. The degree to which portion 6 extends into or is received by the casing thus can be adjusted or varied for the purposes which will be described. A lock nut 17 firmly secures section 6 in its adjusted disposition and a sealing ring 18 or the like is employed to exclude moisture or dirt such as might degrade the operation of the system as a whole. It also is to be noted that the mounting achieved by nut 14 is such that the Kaman transducer can be detached from casing 11 without disturbing either the transducer setting as fixed by lock nut 17 or the setting of the casing components. This arrangement permits the components to be disassembled for cleaning or for other purposes and to be subsequently reassembled and used without the need for recalibration.

The other or forward end of casing 11 mounts a stainless steel plunger 19 which is slidable or reciprocable within bore 12 of the casing and which is formed with outer and inner wall surfaces 20 and 21. Although it presently is preferred to employ a stainless steel alloy in the fabrication of plunger 19, it is contemplated that other materials can be substituted providing these materials are electrically conductive. As shown, plunger 19 normally projects outwardly of casing 11 and a contact head 22 is mounted in a bore formed in outer end wall 20. Most suitably, head 22 is provided with a diamond contact tip 23. A flexible dust cover member 24 is securely bonded to the casing and to the plunger to provide atmospheric protection. A compression spring 26 normally urges plunger 19 outwardly. This spring, as shown, is mounted in the counterbore that receives the plunger so as to bear at one of its ends against the innermost wall of the bore and at its outer end against a radial flange 27 formed on the plunger itself. A guide ring may be provided at the outer end of the casing to assist in stabilizing the reciprocable movements.

To limit the reciprocable movements of the plunger, a setscrew 29 is threadably mounted in the casing, the screw being formed with a precisely dimensioned, reduced-diameter inner projection 31 fitted into and riding within a closely-dimensioned longitudinal groove or slot 32 formed in plunger 19. Consequently, the reciprocations of plunger 19 are restricted by the longitudinal extent of the plunger slot which, of course, is the distance between its end walls. Also, as is apparent, the normal position of the plunger is one in which it is extended to the outward limit of the slot, or in other words, the setscrew projection is bearing against the forward wall of the slot. This normal position, is a direct result of the outwardly-directed spring pressure on the plunger.

Generally considered, the use of the cartridge simply involves mounting transducer 1 in a fixed disposition with its inner end at a predetermined spacing from inner wall 21 of the plunger. The plunger then is contacted with the surface to be measured and the surface moved relatively to the cartridge to detect surface undulation. Obviously, hills or valleys cause the plunger to reciprocate and produce variations in the spacing between its inner wall 21 and the transducer. Consequently, variations in the eddy-currents or field produced by the transducers are directly converted to the normal D. C. output which, as already indicated, also can be digitized to directly read in a displacement differences.

To assure complete reliability, sensitivity and accurate repeatability of the cartridges system, there are several features of the cartridge arrangement which should be particularly noted. First, as has been noted, the Kaman MULTI-VIT system, as well as other systems, include a series of transducer arrangements each unit of which is designed especially for accurately gaging a particular displacement range. Sensitivity of the particular unit is achieved only when the measurements or, in other words, the displaced distances vary within the range limits. For example, the system illustrated in FIG. 1, the so-called KD-2300-ISU Kaman system, can accurately gage the distance to a conducting target up to a range of 0.05 inches although, as has been found in its use with the present cartridge, this particular unit actually is dependable up to a range of 0.65 inches with no significant increase in total systematic error or repeatability. Such being the case, the present cartridge system, when adapted for this particular FIG. 1 unit, should limit the plunger reciprocation to the desired range which, as stated may have an outermost limit of 0.65 inches.

The present arrangement accomplishes this plunger stroke limitation in a simple but very effective manner. Also, as explained, it permits the transducer to be physically removed from the cartridge for cleaning or other purposes and subsequently remounted without affecting the reciprocal limits. To achieve these purposes, the arrangement is such that its plunger always is held at its outermost position with projection 31 of its setscrew bearing against the inner wall of slot 32. Transducer 1 then can be mounted in the casing and precisely disposed relative to inner wall 21 of the plunger. Fine adjustments relative to nut 14 are achieved by employing precisely dimensioned, tight threads on the bore surface of the nut. In practice, standard point 112-40 UNC-2B threads are used. It also is to be noted that the use of nut 14 or its equivalent provides the cartridge with the capability of receiving different sized transducers simply by providing different bore diameters suited to each of the transducer units. The precise limits of the plunger reciprocation are easily and exactly fixed by use of an appropriate micrometer. With the plunger fully extended, a micrometer can be used to depress it a precise distance equal, for example, to the 0.05 range of the illustrated FIG. 1 transducer system. This setting, of course, moves the plunger inwardly precisely 0.05 inches so that at this particular range, the inner end of the transducer can be brought into contact with wall 21 of the plunger to assure the desired inward limit. Once this limit has been set, the cartridge can be used for long periods of time without the need for recalibration. Lock nut 17 firmly fixes the setting and the sealing ring maintains its integrity. Detachment for cleaning can be achieved in the obvious manners and without disturbing the calibration.

Obviously, the cartridge mounted transducer should be calibrated after the plunger reciprocations have been set. However, this calibration can be accomplished in the manner employed for calibrating the transducer system itself. In this regard, the Kaman transducer system provides a wide adjustment for voltage output versus displacement scale factor. The basic calibration factor is a one volt reading at a full scale displacement of 0.05 inches. This, of course, can be varied and in the present arrangement which will be described, it is desired to provide readout directly in thousandths so that the gain factors can be calibrated accordingly and also so that a particular 3½ panel meter can be used for display.

Figure 3:
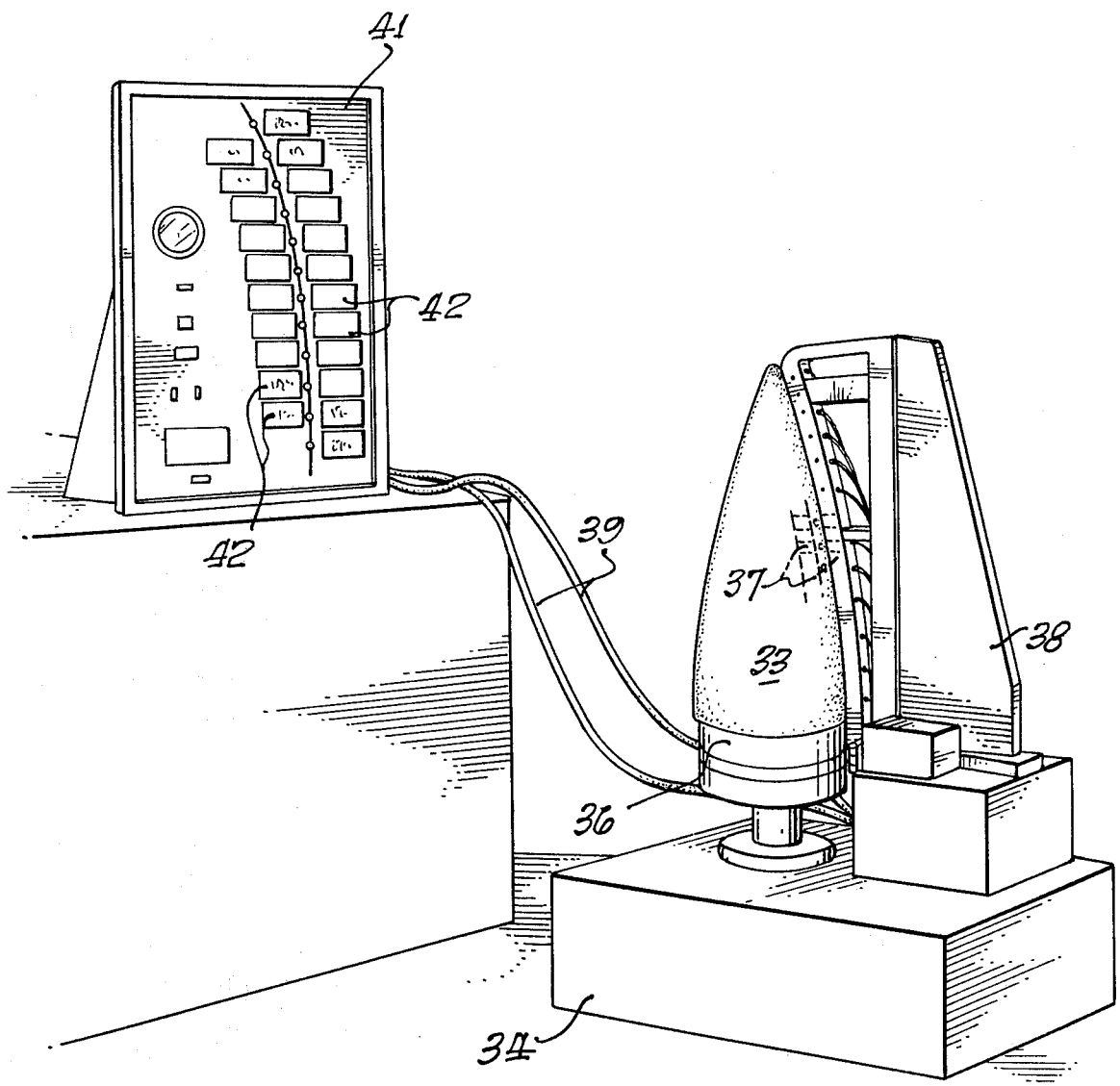

FIG. 3 illustrates one of the contemplated uses of the present cartridge-mounted transducer system. In particular, the illustrated set-up is a gage for measuring with a micrometer accuracy the tolerance of randome surfaces. Radomes, such as those identified by numeral 1, are formed of a glass composition which, in the final steps of manufacture, must be ground to a close tolerance. The fact that the composition is a non-conductive material precludes the use of non-contacting electronic micrometers such as those illustrated in FIG. 1. However, the advantages of these non-contacting units can be achieved by employing the present cartridge arrangement.

As shown in FIG. 3, the gage includes a platform 34 mounting a rotatively-driven radome support 36 shaped to receive radome 33. The functional parts of the gage are provided by a pair of elongate arms 37 hinged together at their bottom end and supported by a vertical standard 38. The pair of arms each are shaped and dimensioned to closely follow the contour of the radome and a plurality of transducer-mounted cartridges are mounted in a spaced disposition in each of the arms to measure the outer and inner surfaces of the radome. The outputs of the mounted transducers are supplied through cables 39 to the systems electronics which may be mounted in a panel 41 having digital display windows 42 for each of the employed transducers.

Obviously, it is necessary to calibrate the entire gage system before use. This calibration preferably is accomplished by employing a setmaster which is not shown but which is a dummy unit precisely ground to the exact dimensions of the radome to be measured. The set-master is disposed between arms 37 and the cartridges mounted in the arms then adjusted to contact the setmaster. Adjustments then are made electronically at the transducer zero control to provide nominal indications or read-outs. The set-master then is removed and replaced by the radome. Variations from the nominal indications then directly read in thousandths of an inch or in whatever other unit may be desired. Obviously, the read-out can directly indicate variations in each surface, or, as presently is being done in the radome measurements, the inner surface contours are directly read in the inner panel display windows while the outer windows read variations in thickness. The thickness variation of course requires circuitry to obtain differential readings from each pair of transducers with the outputs of the pair summed through an operational amplifier. It also should be apparent that the cartridge-mounted transducers can be employed for a number of purposes other than the flatness measurement of finished walls such as the radome walls. In general, the present system has proven to be very stable, reliable and especially suited for obtaining rapid micrometer readings on surfaces which previously have posed serious problems.

Obviously many modifications and variations of the present invention are possible in the light of the above teachings. It is therefore to be understood that within the scope of the appended claims the invention may be practiced otherwise than as specifically described.

We claim:
1. Surface-contacting electronic micrometer gage apparatus for linearly measuring surface contours, comprising:
    a transducing measuring system including an elongate transducer member having an active element providing an electrical output proportional to variations in the displacement of the element from the surface of a conductive material
    an elongate tubular casing having one of its end portions detachably receiving (adapted to retainably receive) said active element,
    means for adjusting the received length of said transducer member (portion),
    a plunger reciprocably mounted in the other end portion of said casing, said plunger having an inner end portion formed of a conductive material and an outer end portion adapted to contact and follow a surface to be measured,
    resilient means reciprocably urging said plunger outwardly of said casing, and
    abutment means carried by the casing for physically limiting the extent of the resiliently-urged (limiting the) outward travel of said plunger,
    whereby said transducer member can be adjustably disposed in said casing with its active element fixed a spaced distance from said conductive material at the inner end of the plunger for physically limiting its inward reciprocal movement, said outer end of the plunger projecting outwardly of said casing at said inward limit for resiliently following contacted surface contours,
    said spacing of said (transducer) active element being fixed in accordance with the displacement range of the transducer member and said electrical output of said (transducer) active element varying responsively to the variations in said spacing produced by said surface following plunger.

2. The apparatus of claim 1 further including means for locking said transducer member in said fixed disposition.

3. The apparatus of claim 1 wherein said abutment means includes:
   an elongate recess having outer and inner wall portions spaced apart a predetermined distance selected in accordance with said transducer member displacement range, and
   a recess-engaging means carried by said casing and formed with an inner end extending into said recess for abutting said recess walls during plunger reciprocation.

4. The apparatus of claim 1 further including: a nut-like member threadably received in said one end portion of said casing, said member having a threaded bore for adjustably receiving and retaining said transducer member portion whereby said transducer member can be detached from said casing without affecting the fixed disposition of said plunger relative to said casing.

5. The apparatus of claim 4 further including sealing means for said transducer-receiving bore of said nut-like member.

6. The apparatus of claim 1 further including: a flexible cover member protectively enveloping said outwardly projecting end portion of said plunger, said member being secured at one end to the casing and at the other to said plunger.

7. The apparatus of claim 1 wherein said plunger is formed of a stainless steel alloy.

* * * * *